United States Patent [19]

Nehls

[11] Patent Number: 5,188,479

[45] Date of Patent: Feb. 23, 1993

[54] TUBULAR FRAMING SYSTEM

[75] Inventor: Charles O. Nehls, Allen Park, Mich.

[73] Assignee: Unistrut International Corp., Ann Arbor, Mich.

[21] Appl. No.: 876,248

[22] Filed: Apr. 30, 1992

[51] Int. Cl.⁵ ............................................... B25G 3/00
[52] U.S. Cl. ................................... 403/306; 403/300; 403/363
[58] Field of Search ............. 403/363, 300, 306; 52/732, 731; 411/85, 84

[56] References Cited

U.S. PATENT DOCUMENTS

| 1,850,118 | 3/1932 | Meyers | 52/732 X |
| 1,859,259 | 5/1932 | Chamberlain et al. | 403/306 X |
| 2,737,268 | 3/1956 | Smith | 411/85 X |
| 3,511,000 | 5/1970 | Keuls | 52/732 X |
| 4,069,638 | 1/1978 | Hasselqvist et al. | 403/363 X |
| 4,261,470 | 4/1981 | Dolan | |
| 4,784,552 | 11/1988 | Rebentisch | |
| 5,116,161 | 5/1992 | Faisst | 411/85 X |

FOREIGN PATENT DOCUMENTS 699696 12/1964 Canada ............................. 403/306

Primary Examiner—Andrew V. Kundrat
Attorney, Agent, or Firm—Dykema Gossett

[57] ABSTRACT

A versatile framing system incorporates open channel members and closed tubular members. The closed tubular members provide strength, while the open channel member allows various members to be attached at an infinite number of positions along its length. The inventive system thus successfully incorporates the advantages of both open channel members and closed tubular members.

14 Claims, 3 Drawing Sheets

TUBULAR FRAMING SYSTEM

BACKGROUND OF THE INVENTION

This application relates to a framing system which incorporates both closed tubular frame members and open channel members into a single versatile system.

In the prior art, framing systems have typically used either closed tubular members which have bolt holes for attachment to other members, allowing incremental adjustment, or open channel members which allow infinite adjustment within the channel for attachment of various members. The prior art has not successfully incorporated closed tubular members with open channel members. The prior art has also not been successful in attaching open channel members to closed tubular members or other supports, without the use of numerous attachment members.

Closed tubular members are advantageous in that they are stronger than open channel members. Open channel members, however, allow infinite adjustment of the position at which various members are attached. Further, open channel members have typically not been used with through bolt connections, which are used with closed tubular members and provide a strong mount. It would be desirable to gain the benefits of both types of members. The present invention has developed a system which allows the two types of framing members to be utilized in combination.

SUMMARY OF THE INVENTION

A disclosed system according to the present invention includes closed tubular members having a rectangular cross-section with four closed sides and a central bore. The closed tubular members are attached to open channel members. The open channel members have an outer peripheral surface which is received within the bore of the closed tubular member. The open channel member preferably has at least one side which defines a channel for receiving an attachment member such as a bolt. In a further preferred embodiment of the present invention, a smaller sized closed tubular member may also be received within the bore in the larger, first mentioned closed tubular member. The larger closed tubular member can then be used as a joint to attach open channel member sections to the smaller closed tubular member sections. This results in a strong connection, without complicated attachment members.

In a further feature of the present invention, the various framing members have bolt holes extending through their closed sides which are spaced by equivalent amounts. Thus, bolts can be extended through mating bolt holes to allow for incremental adjustment of the relative positions of the larger closed tubular member, the smaller closed tubular member, and of the open channel members.

Various attachment members are disclosed to result in any one of several configurations of final systems. Further, a rivet can be extended through the bolt holes such that the framing members can be attached easily and quickly. Only a simple tool such as a hammer is necessary.

These and other features of the present invention can be best understood from the following specification and drawings, of which the following is a brief description.

DETAILED DESCRIPTION OF A PREFERRED EMBODIMENT

Figure 1:
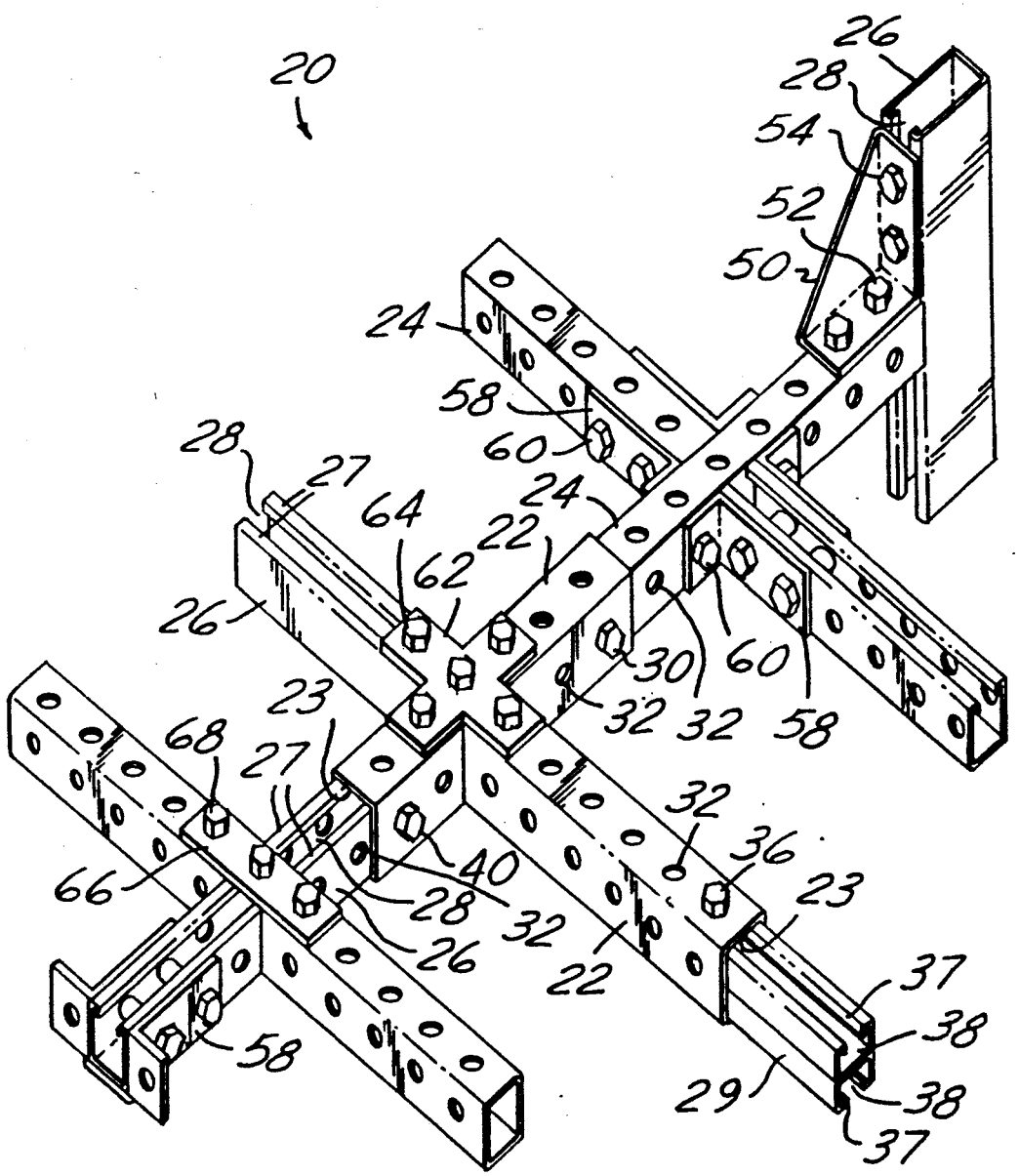
FIG. 1 is a perspective view of a number of possible connections between the various framing members of the inventive system.

An inventive framing system 20 is illustrated in FIG. 1 incorporating a large closed tubular member 22, which is rectangular. Large closed tubular member 22 has four closed sides, defining an inner peripheral bore 23 which is greater in dimension than the outer dimensions of a smaller closed tubular member 24. Small closed tubular member 24 may be attached to one end of large closed tubular member 22, while an open channel member 26 may be attached to the other end of large closed tubular member 22.

As shown, open channel member 26 incorporates two lips 27 extending laterally inwardly to define a channel 28. Channel 28 may receive a bolt to attach a support member, or a member to be supported, to open channel member 26. The location of the bolt within channel 28 is infinitely adjustable such that the location of the support/supported member is also infinitely adjustable. The basic bolt and channel configurations are well known in the art.

As also shown, a bolt 30 can extend through mating bolt holes 32 in large and small closed tubular members 22 and 24 to secure the two at any one of several incremental positions. The bolt holes 32 on the small closed tubular member 24 are preferably spaced by a distance approximately equal to the distance between bolt holes 32 on the large closed tubular member 22. Further, bolt holes 32 may also be formed in closed sides of open channel member 26. Again, the spacing between bolt holes 32 in open channel member 26 is preferably approximately equal to the spacing between the bolt holes 32 in closed tubular members 22 and 24. Thus, a member such as large closed tubular member 22 can act as a bridge or sleeve to connect open channel member 26 to small closed tubular member 24. Small closed tubular member 24 may be stronger than open channel member 26. Open channel member 26, however, allows support/supported members to be attached in an infinite number of positions, thus increasing the flexibility of the overall system.

As shown to the lower right portion of FIG. 1, a bolt 36 can pass through a bolt hole 32 in a large closed channel member 22, and be received in a second type of open channel member 29. Second open channel member 29 includes two lips 37 extending laterally inwardly at upper and lower positions to define channels 38 at both upper and lower positions. Bolt 36 is frictionally secured within channel 38 at the upper position, as is well known. A member to be supported by channel 29 can then be positioned at any of an infinite number of positions from the lower channel 38. The use of the large closed tubular member 22 allows a secure connection between second open channel member 29 and a support structure. As previously discussed, a bolt 40 can also pass through bolt opening 32 in large closed channel member 22 and be received within bolt holes 32 in open channel member 26, as show in the lower left portion of FIG. 1. This provides a fixed, secure connection between tubular member 22 and channel 26 at incremental positions.

As shown in the upper right portion of FIG. 1, a framing elbow 50 may have bolts 52 extending into bolt holes 32 in one framing member, small closed tubular member 24 being shown. Bolts 54 may also extend into channel 28 on a open channel member 26. In this way, it is relatively easy to define a strong 90° connection between an open channel member 26 and a closed tubular member 24.

Simple elbows 58 are also shown with bolts 60 extending into bolt holes 32 in both open and closed tubular members. Further, a cross attachment 62 having bolts 64 may extend into bolt holes 32, and channels 28 to secure several framing members of the inventive system 20. Finally, member 66 may receive bolt 68 which attach three framing members together simply and quickly.

It should be understood that FIG. 1 is an imaginary view developed to show some possibilities of system 20. The main features of the present invention relate to its versatility, rather than any particular configuration.

Figure 2:
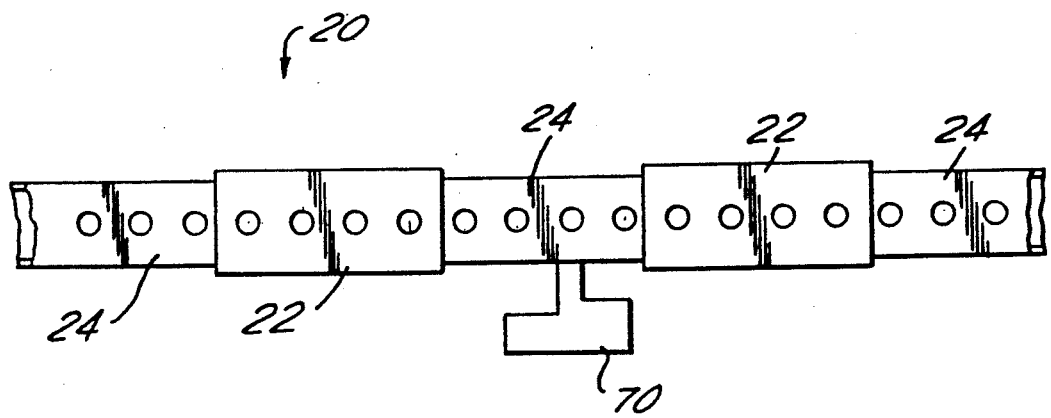
FIG. 2 is a highly schematic view showing one application of the inventive system.

As shown in FIG. 2, a small closed tubular member 24 can extend through a great distance, such as along a ceiling in an industrial environment. A large closed tubular member 22 can bridge a connection between small closed tubular member 24 and an open channel member, such as open channel member 29. Large closed tubular member 22 thus provides a sleeve to securely connect small closed tubular portions 24 to open channel member 29. The connection is simple and strong. A member 70 may now be hung from open channel member 29 at any of an infinite number of positions along the length of channel 29. Thus, system 20 provides a strong simple system which allows infinite adjustment in areas where members are to be attached.

Figure 3:
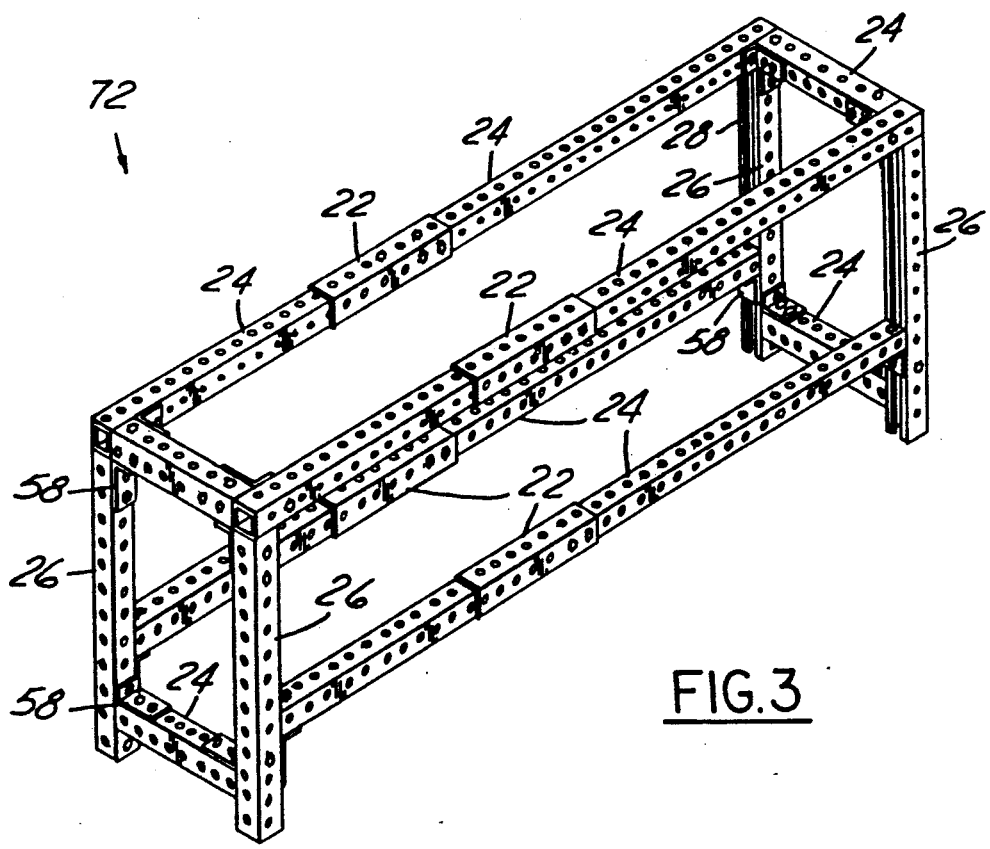
FIG. 3 is a perspective view showing other applications of the inventive system.

FIG. 3 shows another configuration of system 20. Here system 20 has been configured into a shelving unit 72. As shown, cross sides are configured of small closed tubular members 24 while side uprights are formed of open channel members 26. The cross members are formed of two small closed tubular members 24 with a large closed tubular member section 22 acting as a sleeve between the two smaller closed tubular member sections 24. In this way, the overall length of the shelving unit 72 can be incrementally adjusted by telescopically adjusting the members. As further shown, the height of the cross members formed of the closed tubular members 24 can be infinitely adjusted within channel 28 in open channel members 26. Thus, the inventive system 20 provides a strong shelving system which may be easily reconfigured into any shape or size.

The use of the large closed tubular member 22 as a sleeve increases the load carrying capacity. Further, the time in setting up these systems is relatively small over comparable systems.

The above-disclosed structures are not meant to be limiting. The present invention can be utilized in any number of configurations. As non-limiting examples, racks, shelvings, trapeze hangers, cable tray supports, equipment stands, boat stands, seismic supports, truck racks, structural mezzanine supports, adjustable pipe supports, lighting supports, jack stands, cable racks, conveyor stands and other uses readily are envisioned. The inventive features of this invention extend more towards the versatility that flows from the inventive system which allows open channel members to be readily attached to closed tubular members.

In one preferred embodiment, the small closed tubular members and the open channel members had 1⅝ by 1⅝ outer peripheries. The large closed tubular member had a 1⅞ by 1⅞ outer periphery. All of the tubular members were manufactured from 12 gauge (0.105 wall thickness) low carbon strip steel. Bolt holes 32 were preferably 9/16" in diameter, and spaced by 1⅞".

Figure 4:
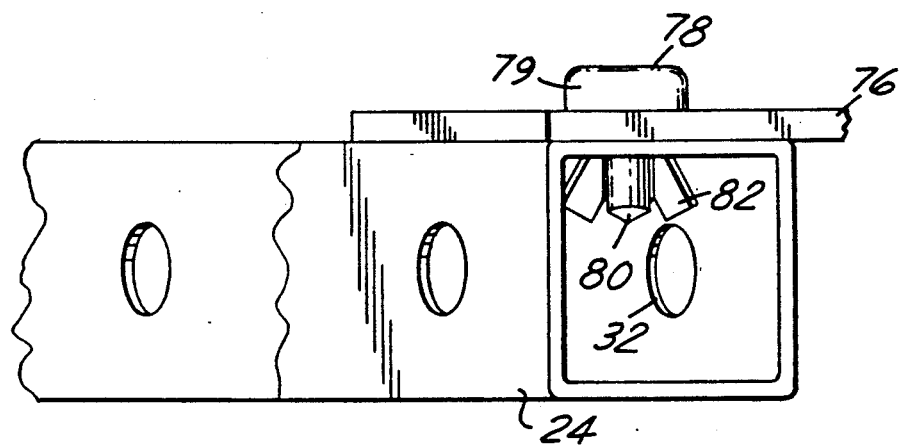
FIG. 4 is a perspective view showing an alternative fastener member according to the present invention.
Figure 5:
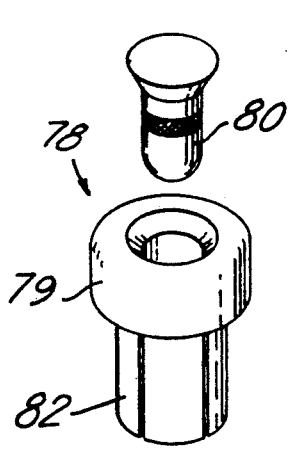
FIG. 5 is a perspective view of the components of the alternative fastener.

An alternative fastener to replace bolts as utilized in the above-described structures is illustrated in FIGS. 4 through 7. As shown in FIG. 4, a rivet 78 includes a sleeve 79 and a pin 80. Pin 80 forces ears 82 on sleeve 79 outwardly to secure rivet 78 in a bolt hole 32. As shown, this attaches a member such as plate member 76 to a closed tubular member 24. As should be understood, rivet 78 can also be used through bolt holes in aligned framing members. As shown in FIG. 5, pin 80 is separate from sleeve 79 and ears 82.

Figure 6:
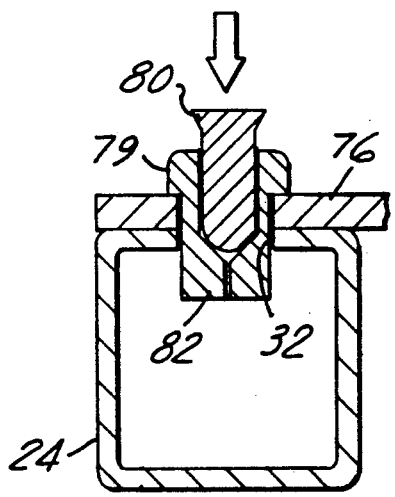
FIG. 6 is a cross-sectional view of the initial positioning of the alternative fastener member.

As shown in FIG. 6, pin 80 is initially received outwardly of sleeve 79, and ears 82 are initially bent radially inwardly. In this way, ears 82 can move into bolt holes 32 in both plate 76 and closed tubular member 24.

Figure 7:
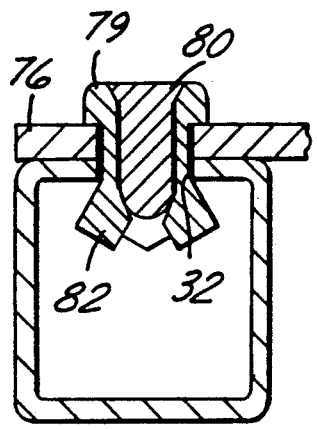
FIG. 7 shows a step subsequent to that shown in FIG. 6.

As shown in FIG. 7, pin 80 is forced downwardly into sleeve 79 and ears 82 bend radially outwardly. This locks rivet 78 within bolt hole 32, securing plate 76 to closed tubular member 24.

Although preferred embodiments of the present invention have been disclosed, a worker of ordinary skill in the art would recognize that certain modifications would come within the scope of this invention. For that reason the following claims should be studied in order to determine the true scope and content of this invention.

I claim:

1. A framing system comprising:
   a first closed tubular member having a generally polygonal cross-section with closed sides along the majority of its length defining a bore; and
   an open channel member received within said first closed tubular member and having a polygonal cross-section with closed sides along the majority of its length and at least one open side along the majority of its length defining a channel to receive an infinitely adjustable securement member.

2. A system as recited in claim 1, wherein said first closed tubular member and said open channel member are rectangular in cross-section.

3. A system as recited in claim 2, wherein said open channel member has bolt holes along one closed face, and said first closed tubular member has bolt holes along one closed face, and a securement member extends through said bolt holes to secure said open channel member within said bore.

4. A system as recited in claim 3, wherein said securement member is a rivet having a pin which forces a number of ears radially outwardly.

5. A system as recited in claim 2, wherein said first closed tubular member has bolt holes along one closed side, with a securement member passing through said bolt holes and being received within said channel on said open channel member such that said securement member may be infinitely adjusted within said channel to infinitely adjust the position of said open channel member within said bore in said first closed tubular member.

6. A system as recited in claim 1 wherein there is a second closed tubular member, said second closed tubular member also having a polygonal cross-section, with the outer dimensions of said second closed tubular member and said open channel member being less than the inner dimensions of said sides on said first closed tubular member such that said first closed tubular member may receive both said second closed tubular member and said open channel member within said bore to provide a sleeve connecting the two.

7. A system as recited in claim 6, wherein bolt holes are formed along said closed sides of said first closed tubular member, said second closed tubular member and said open channel member, said bolt holes being selectively aligned to receive bolts to secure said members at incremental positions.

8. A system as recited in claim 7, wherein said bolt holes on said first closed tubular member, said second closed tubular member and said open channel member are spaced by equal distances.

9. A system as recited in claim 1, wherein said first closed tubular member is connected at a 90° angle relative to said open channel member.

10. A system as recited in claim 9, wherein said first closed tubular member has bolt holes along one of said closed faces, and said open channel member also has bolt holes, said 90° angle connection being provided by securing an elbow member to said first closed tubular member and to said open channel member by passing bolts through said bolt holes.

11. A system as recited in claim 9, wherein said first closed tubular member has bolt holes along one of said closed faces, and said 90° angle connection is provided by securing a 90° elbow to said first closed tubular member by passing a bolt through one of said bolt holes, and said elbow being secured to said open channel member by passing a bolt into said channel.

12. A system as recited in claim 9, wherein said first closed tubular member has bolt holes along one of said closed faces, and said 90° angle connection includes members extending in each of four directions spaced 90° from each other from a central cross shaped connection member.

13. A system as recited in claim 12, wherein said cross shaped member is secured to a first closed tubular member, and also secured to members extending at 90° from said first closed tubular member.

14. A framing system comprising:
a first closed member having a generally polygonal cross-section with closed sides defining a bore;
an open channel member received in sad bore of said first closed tubular member and having a polygonal cross-section with closed sides along the majority of its length and at least one open side along the majority of its length defining a channel to receive and infinitely adjustable securement member;
a second closed tubular member along having a polygonal cross-section, with the outer dimensions of said second closed tubular member and said open channel member being less than the inner dimensions of said sides on said first closed tubular member such that said first closed tubular member may receive both said second closed tubular member and said open channel member within said bore; and
both said open channel member and said second closed tubular member being received in opposed ends of said first closed tubular member such that said first closed tubular member provides a sleeve connecting said second closed tubular member and said open channel member.

* * * * *